(12) United States Patent
Riedijk et al.

(10) Patent No.: US 9,672,401 B2
(45) Date of Patent: *Jun. 6, 2017

(54) FINGERPRINT SENSING SYSTEM AND METHOD

(71) Applicant: Fingerprint Cards AB, Göteborg (SE)

(72) Inventors: Frank Robert Riedijk, Delft (NL); Hans Thörnblom, Kungsbacka (SE)

(73) Assignee: FINGERPRINT CARDS AB, Göteborg (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/172,930

(22) Filed: Jun. 3, 2016

(65) Prior Publication Data
US 2016/0283771 A1 Sep. 29, 2016

Related U.S. Application Data

(63) Continuation of application No. 14/324,549, filed on Jul. 7, 2014, now Pat. No. 9,383,876.

(30) Foreign Application Priority Data

Jul. 9, 2013 (EP) .................................. 13175677

(51) Int. Cl.
G06F 3/045 (2006.01)
G06K 9/00 (2006.01)
(Continued)

(52) U.S. Cl.
CPC ......... *G06K 9/00013* (2013.01); *G06F 3/044* (2013.01); *G06K 9/0002* (2013.01);
(Continued)

(58) Field of Classification Search
None
See application file for complete search history.

(56) References Cited

U.S. PATENT DOCUMENTS 5,650,597 A 7/1997 Redmayne
6,628,812 B1 9/2003 Setlak et al.
(Continued)

FOREIGN PATENT DOCUMENTS

EP 0969477 A1 1/2000
EP 2650823 A2 10/2013
WO 2005124659 A1 12/2005

OTHER PUBLICATIONS

Extended European Search Report for European Patent Application No. 13175677.7 dated Oct. 29, 2013, 6 pages.
(Continued)

Primary Examiner — Jennifer Mehmood
Assistant Examiner — Stephen T Reed
(74) Attorney, Agent, or Firm — Remarck Law Group PLC

(57) ABSTRACT

A fingerprint sensing system comprises a sensor array with a plurality of sensing structures and read-out circuitry connectable to each of the sensing structures, and power supply circuitry arranged to provide to the read-out circuitry a substantially constant supply voltage being a difference between a high potential and a low potential. The fingerprint sensing system is configured in such a way that the low potential and the high potential are variable while substantially maintaining the supply voltage, and the read-out circuitry is connectable to each of the sensing structures in such a way that a variation in the low potential and the high potential while substantially maintaining the supply voltage results in a change of the charge carried by a sensing structure connected to the read-out circuitry. The change in charge is indicative of a capacitive coupling between the sensing structure and the finger.

15 Claims, 6 Drawing Sheets

(51) Int. Cl.
*G06F 3/044* (2006.01)
*H04N 5/232* (2006.01)
*H04N 5/376* (2011.01)
*H04N 5/378* (2011.01)

(52) U.S. Cl.
CPC ......... *H04N 5/23241* (2013.01); *H04N 5/378* (2013.01); *H04N 5/3765* (2013.01)

(56) References Cited

U.S. PATENT DOCUMENTS

| | | |
|---|---|---|
| 7,864,992 B2 | 1/2011 | Riedijk et al. |
| 2005/0031175 A1 | 2/2005 | Hara et al. |
| 2005/0083768 A1 | 4/2005 | Hara |
| 2006/0076963 A1* | 4/2006 | Miyasaka ............ G06K 9/0002 324/662 |
| 2010/0085322 A1 | 4/2010 | Mamba et al. |
| 2013/0070977 A1 | 3/2013 | Orandi et al. |
| 2013/0181949 A1 | 7/2013 | Setlak |
| 2013/0271422 A1 | 10/2013 | Hotelling et al. |
| 2013/0294662 A1 | 11/2013 | Franza et al. |
| 2013/0314105 A1* | 11/2013 | Setlak ................ G01R 27/2605 324/663 |

OTHER PUBLICATIONS

International Search Report and Written Opinion dated Nov. 10, 2014 for PCT International Application No. PCT/SE2014/050852, 12 pages.

* cited by examiner

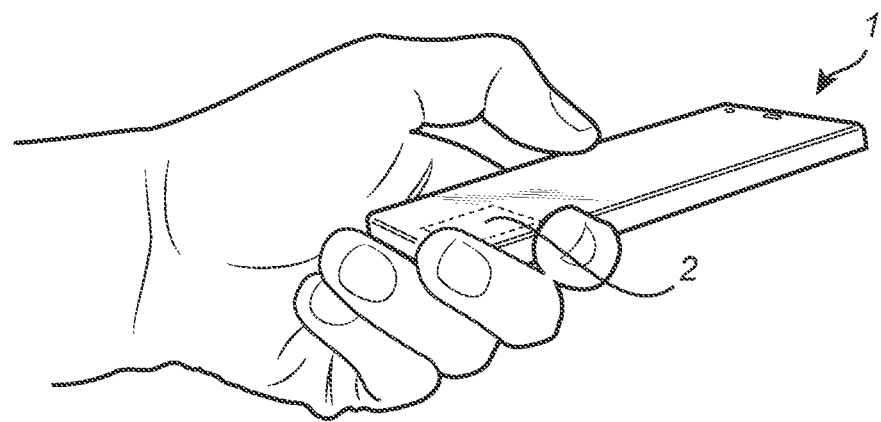
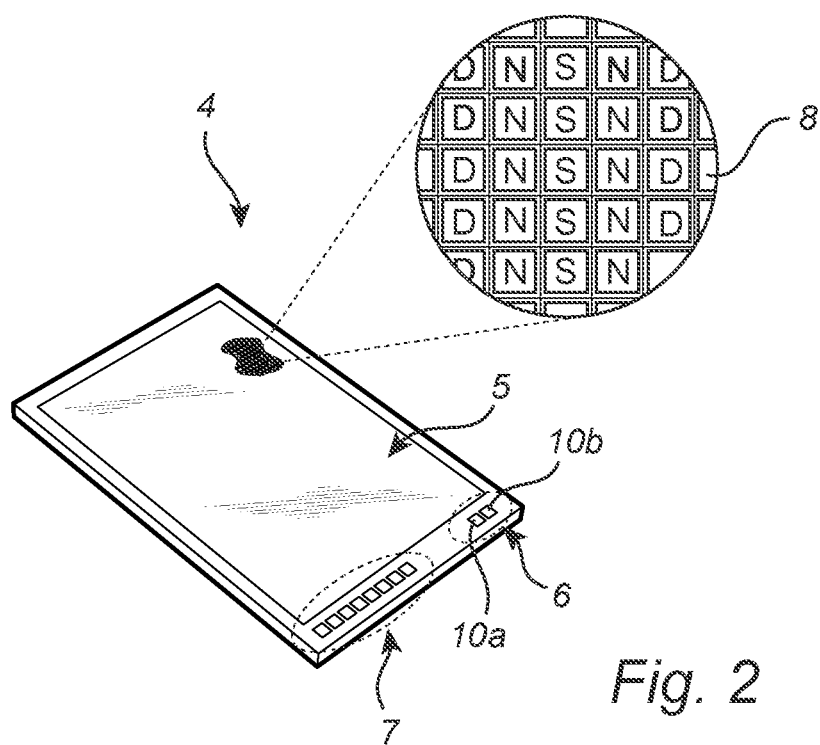
Fig. 1
Fig. 2

FINGERPRINT SENSING SYSTEM AND METHOD

CROSS-REFERENCE TO RELATED APPLICATIONS

This application is a continuation of U.S. patent application Ser. No. 14/324,549, filed on Jul. 7, 2014. The disclosure of the above application is incorporated herein by reference in its entirety.

FIELD OF THE INVENTION

The present invention relates to a fingerprint sensing system and to a method of operating a fingerprint sensor.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance and user acceptance.

Among the various available fingerprint sensing principles (such as capacitive, optical, thermal etc.), capacitive sensing is most commonly used, in particular in applications where size and power consumption are important issues.

All capacitive fingerprint sensors provide a measure indicative of the capacitance between several sensing structures and a finger placed on or moved across the surface of the fingerprint sensor.

Some capacitive fingerprint sensors passively read out the capacitance between the sensing structures and the finger. This, however, requires a relatively large capacitance. Therefore such passive capacitive sensors are typically provided with a very thin protective layer covering the sensing structures, which makes such sensors rather sensitive to scratching and/or ESD (electro-static discharge).

U.S. Pat. No. 7,864,992 discloses a fingerprint sensing system in which a driving signal is injected into the finger by pulsing a conductive structure arranged in the vicinity of the sensor array and measuring the resulting change of the charge carried by the sensing structures in the sensor array.

Although the fingerprint sensing system according to U.S. Pat. No. 7,864,992 provides for an excellent combination of fingerprint image quality and sensor protection, there appears to be room for improvement for "difficult" fingers, in particular for dry fingers.

SUMMARY

In view of above-mentioned and other drawbacks of the prior art, it is an object of the present invention to provide an improved fingerprint sensing system, in particular providing for improved sensing of fingerprints from "difficult" fingers, such as dry fingers.

According to a first aspect of the present invention, it is therefore provided a fingerprint sensing system comprising a sensor array having a plurality of sensing structures each facing a surface of the sensor array and being arranged to capacitively couple to a finger touching the surface of the sensor array; and read-out circuitry connectable to each of the sensing structures for providing sensing signals indicative of a change of a charge carried by each of the sensing structures; and power supply circuitry arranged to provide to the read-out circuitry a substantially constant supply voltage being a difference between a high potential and a low potential, wherein: the fingerprint sensing system is configured in such a way that the low potential and the high potential are variable while substantially maintaining the supply voltage; and the read-out circuitry is connectable to each of the sensing structures in such a way that a variation in the low potential and the high potential while substantially maintaining the supply voltage results in a change of the charge carried by a sensing structure connected to the read-out circuitry, the change of the charge carried by the sensing structure being indicative of a capacitive coupling between the sensing structure and the finger.

The above-mentioned "low potential" will herein sometimes also be referred to as the reference potential of the sensor array.

It should be noted that the low potential and the high potential are time-varying in relation to a reference potential of a device comprising the fingerprint sensing system. Such a reference potential of the device may be referred to as "device ground", and the time-varying low potential may be referred to as "sensor ground". According to various embodiments of the present invention, the "sensor ground" may vary in relation to the "device ground". The potential of the finger may typically be at a substantially constant level, at least for the relevant time scale for fingerprint acquisition, in relation to the "device ground". For instance, the body of the user may actually define the "device ground" for a portable device that is not connected to some global reference potential (like mains ground).

The read-out circuitry may provide analog sensing signals, for example in the form of voltage levels being indicative of the capacitive coupling between the finger and the sensing structures comprised in the sensor array.

According to various embodiments, however, the read-out circuitry may include circuitry for converting analog signals to digital signals. Such circuitry may include, for example, at least one sample and hold circuit and at least one analog to digital converter circuit.

The present invention is based upon the realization that improved fingerprint sensing performance can be achieved by allowing the reference potential of the sensor array to "swing" relative to the potential of the finger instead of forcing the finger potential to vary while keeping the reference potential of the sensor array (the sensor ground) constant.

The present inventors have further realized that a fingerprint sensing system in which the reference potential of the sensor array is allowed to "swing" can be designed so that it is capable of reading out high quality fingerprint images without having a conductive structure supplying a signal to the finger and without reducing the thickness of the protective layer.

The absence of a conductive structure (such as a conducting frame surrounding the sensor array) simplifies integration of the fingerprint sensor into various devices, such as mobile phones and computers. Moreover, the design of the fingerprint sensor system can be made less obtrusive and the finish of the product including the fingerprint sensor system can be improved.

In addition, sensing performance can be improved in applications where the finger or other parts of the hand of a user contacts a conductive part of the product in which the fingerprint sensing system is included. Since, in various embodiments of the fingerprint sensing system according to the present invention, fingerprint sensing does not rely upon a varying potential of the finger, the finger can be allowed to be grounded (or at least heavily loaded) by such a conductive part of the product. Examples of such applications include mobile phones with exposed electrically conductive parts.

When providing an excitation signal to the finger through a direct conductive electrical connection, or in other words galvanically driving the finger, the potential difference between the finger surface touching the sensor array and the sensing structures in the sensor array may be different for fingers with different electrical properties. For instance, the potential difference may be lower for dry fingers, resulting in a "weaker" fingerprint image which may be difficult to analyze.

In various embodiments of the present invention, the electrical potential of the finger may be considered to be substantially constant and the reference potential of the sensor array may instead be varied. In such embodiments, the potential difference between the finger surface touching the sensor array and the sensing structures in the sensor array will instead be substantially the same for fingers with different electrical properties. Experiments have verified that this results in improved fingerprint images for dry fingers.

According to various embodiments of the present invention, the power supply circuitry may be configured to provide a first time-varying potential as the low potential and a second time-varying potential as the high potential.

In this manner, an excitation signal may be provided to the sensor array instead of to the finger. Since the power supply circuitry may accordingly pulse the reference potential of the sensor array ("variable sensor ground"), the amplitude of the excitation signal is not limited to the supply voltage to the sensor array, but may be considerably higher. This would allow for the use of a thicker protective coating covering the sensing structures and/or allow for new materials to be used, which provides for a more robust and possibly more visually attractive fingerprint sensor.

In some embodiments, excitation signals may be provided to both the sensor array and the finger or to the finger only. An excitation signal may, for example, be provided to the finger using a finger excitation structure external to the sensor array and/or using sensing structures that are currently not sensing.

According to various embodiments, the read-out circuitry may be controllable to connect to a first set of sensing structures in such a way that the variation of the low potential and the high potential results in a variation of a potential of each sensing structure in the first set, and the read-out circuitry provides signals indicative of the change of charge carried by each sensing structure in the first set; and connect to a second set of sensing structures different from the first set of sensing structures in such a way that the variation of the low potential and the high potential results in a variation of a potential of each sensing structure in the second set.

Hereby, the occurrence of unwanted coupling between sensor elements that are sensing and sensor elements that are not sensing can be reduced. This provides for an improved quality of the fingerprint sensing carried out by the fingerprint sensing system. This is particularly the case when sensing and non-sensing sensor elements are arranged next to each other, in other words, when sensing structures in the second set are arranged adjacent to sensing structures in the first set.

Advantageously, the variation of the potential of each sensing structure in the first set and the variation of the potential of each sensing structure in the second set may be substantially equal.

Furthermore, the fingerprint sensing system may advantageously comprise driving circuitry connectable to each of the sensing structures and controllable to change a potential of a sensing structure connected to the driving circuitry. Such driving circuitry may be used to provide the above-mentioned excitation signal to the finger. The driving circuitry may also be used to reduce unwanted excitation of the finger resulting from the variation of the reference potential of the sensor array.

Accordingly, in various embodiments of the present invention, the read-out circuitry may be configured to provide the sensing signal indicative of the change of charge carried by a first sensing structure; and the driving circuitry may be configured to provide a time-varying driving signal to a second sensing structure, the driving signal being such that a potential of the second sensing structure is constant or varies over time with a peak-to-peak amplitude being lower than a peak-to-peak amplitude of a potential of the first sensing structure.

To achieve this effect, the driving circuitry may, for instance, be configured to drive the second sensing structure with a driving signal that is substantially in anti-phase with the variation of the reference potential of the sensor array. In embodiments where the variation of the reference potential of the sensor array has a peak-to-peak amplitude that is greater than the supply voltage to the sensor array, the driving circuitry will not be able to fully compensate for the variation in the reference potential using the driving signal. However, also in such embodiments, the unwanted excitation (capacitive drive) of the finger can be considerably reduced.

It should be noted that the read-out circuitry and the driving circuitry may advantageously be combined as pixel circuitry that may be controllable between a sensing state and a driving state.

The driving circuitry may advantageously be configured to simultaneously provide the time-varying driving signal to a plurality of sensing structures. For instance, the time-varying driving signal may be provided to all sensing structures except the currently sensing first sensing structure and surrounding sensing structures.

In embodiments of the fingerprint sensing system according to the present invention, the power supply circuitry may comprise a constant voltage source that is configured to provide the substantially constant supply voltage and that is dedicated to supplying power to the sensor array.

Alternatively, the power supply circuitry may comprise isolation circuitry having an input side for connection to a voltage source and an output side connected to the sensor array, the isolation circuitry being configured to prevent current to flow from the output side to the input side, to thereby allow for an output potential on the output side being different from an input potential on the input side.

The isolation circuitry may, for example, comprise at least one diode arranged between the voltage source and the sensor array, whereby different potentials can be achieved on the different sides of the diode.

In one embodiment, the isolation circuitry may be configured to provide galvanic isolation between the voltage source and the read-out circuitry.

Such isolation circuitry providing galvanic isolation is well-known to those skilled in the art, and may, for instance, include optocouplers, or circuitry based on one or more (micro) coils and/or one or more capacitors.

According to various embodiments, the fingerprint sensing system may further comprise processing circuitry connected to the sensor array via a communication interface for acquiring fingerprint data from the sensor array.

The fingerprint data may be raw fingerprint image data, or the data may have been processed and may then be provided in the form of conditioned image data, as fingerprint template data or in any other form.

The communication interface may be any suitable communication interface, which may be a parallel interface or a serial interface. One example of a suitable communication interface may be the SPI-interface (Serial Peripheral Interface).

As was mentioned further above, the sensing signals provided by the read-out circuitry may be analog signals, which may be provided directly to the communication interface. In such embodiments, the fingerprint sensing system may further comprise external circuitry for converting the analog sensing signals to digital signals.

To allow undisturbed acquisition of fingerprint data from the sensor array in embodiments where the reference potential of the sensor array is varied at the same time as fingerprint data is acquired, the fingerprint sensing system according to various embodiments of the present invention may advantageously further comprise isolation circuitry for providing galvanic isolation between the sensor array and the processing circuitry.

Such isolation circuitry is well-known to those skilled in the art, and may, for instance, include optocouplers, or circuitry based on one or more (micro) coils and/or one or more capacitors.

Alternatively or in combination with the above-mentioned isolation circuitry, the power supply circuitry may be configured to keep each of the low potential and the high potential substantially constant during time periods when the processing circuitry acquires fingerprint data from the sensor array.

By configuring the power supply to keep the reference potential of the sensor array constant (and at substantially the same potential as the ground level of the processing circuitry acquiring the fingerprint data) during acquisition, the acquisition can take place without being disturbed by the varying reference potential during fingerprint sensing events. In other words, the reading/acquisition of a complete fingerprint image from the sensor array may be divided into different time slots during which different activities are permitted and forbidden, respectively. For instance, a sensing time slot may be followed by an acquisition time slot, before it may be time for a sensing time slot again. The number and durations of the time slots may depend on the size of the sensor array and the buffering capability of the sensor array. For a swipe sensor (sometimes also referred to as a strip sensor or a line sensor) a single sensing time slot followed by a signal acquisition time slot may be sufficient, while for a touch sensor (area sensor), it may be necessary with several sensing time slots and several acquisition time slots that are interleaved.

According to various embodiments of the present invention, the sensor array may advantageously comprise excitation signal generating circuitry for generating a time-varying, in relation to the low potential (sensor ground potential), excitation signal for synchronizing operation of the read-out circuitry; and an excitation signal output for output of the excitation signal from the sensor array.

In embodiments, the excitation signal may be used to control or trigger the power supply circuitry comprised in the fingerprint sensing system to provide the above-mentioned time-varying, in relation to a reference potential of the electronic device in which the fingerprint sensing system is included, low potential and high potential to the sensor array.

In other embodiments, the excitation signal output may be conductively connected to the reference potential of the device in which the fingerprint sensing system is included, thereby forcing the low potential and the high potential to vary over time in relation to the reference potential.

The excitation signal may, for instance, be a square wave signal in relation to the sensor ground potential.

Since the sensor ground potential of the sensor array is variable in relation to a reference potential of an electronic device including the fingerprint sensing system, tying the excitation signal output to the device reference potential will result in the sensor ground potential swinging up and down in relation to the device reference potential.

Swinging of the sensor ground potential, in relation to the device reference potential, will cause the sensing structures (pixel plates) of the sensor array to also swing up and down in potential in relation to the device reference potential, and thus also in relation to the potential of the finger touching the top surface of the sensor array.

Hence, tying the excitation signal output to the device reference potential will result in a time-varying voltage between the finger and at least selected ones of the sensing structures of the sensor array. By measuring the change in charge carried by a sensing structure resulting from a change in voltage between the finger and that sensing structure, a measure indicative of the capacitance of the capacitor formed by the sensing structure, the finger and the dielectric coating on the sensing structure can be deduced. This measure will also be an indication of the distance between the finger surface and the sensing structure.

Moreover, the fingerprint sensing system according to various embodiments of the present invention may advantageously be included in an electronic device, further comprising processing circuitry configured to acquire a representation of the fingerprint pattern from the fingerprint sensing system; authenticate a user based on the representation; and perform at least one user-requested process only if the user is authenticated based on the representation.

In embodiments where the sensor array comprises the above-described excitation signal generating circuitry and excitation signal output, the excitation signal output may advantageously be connected to a reference potential of the electronic device, such as, for example, device ground or a higher reference potential of the electronic device (such as 3.3 V, 2.5 V or 1.8 V in relation to the device ground potential).

In these embodiments of the fingerprint sensing system (and of the electronic device comprising the fingerprint sensing system), all terminals (except the excitation signal output) of the sensor array (fingerprint sensor) will exhibit time-varying potential levels in relation to the device ground potential. To provide for continuous supply of power to the sensor array and communication between the processing circuitry and the sensor array, the fingerprint sensing system may, as was described further above, include isolation circuitry.

In various embodiments, furthermore, the fingerprint sensing system may comprise an electrically conductive finger contacting structure arranged adjacent to the sensor array for conductive contact with the user's finger when the fingerprint sensing system is in use. Such a finger contacting structure may, for instance, be provided as a bezel or frame, or one or several strips. As an alternative to connecting the excitation signal output to a reference potential terminal for the electronic device (keeping the excitation signal output at a constant voltage in relation to device ground), the excitation signal output may be conductively connected to the finger contacting structure. In such embodiments, the user's finger will be the reference level in relation to which the fingerprint sensor ground will vary. This configuration may be advantageous since the effect of common mode noise on the device ground on the fingerprint sensing may be reduced.

According to a second aspect of the present invention, there is provided a method of operating a fingerprint sensor comprising a sensor array having a plurality of sensor elements, each comprising a sensing structure facing a surface of the fingerprint sensor, wherein each of the sensor elements is configured to provide a signal indicative of a capacitive coupling between the sensing structure and a finger placed on the surface of the capacitive fingerprint sensor; and a power supply interface having a low potential input and a high potential input for providing power to the sensor array, wherein the method comprises the steps of: providing a first time-varying potential to the low potential input of the power supply interface and a second time-varying potential to the high potential input of the power supply interface, a difference between the second time-varying potential and the first time-varying potential being a substantially constant voltage; and acquiring from each of the sensor elements, while providing the first time-varying potential and the second time-varying potential, the signal indicative of the capacitive coupling between the sensing structure and the finger placed on the surface of the capacitive fingerprint sensor.

The above-mentioned signal acquired from each of the sensor elements may be acquired from one sensor element at a time or simultaneously from several sensor elements at a time. Acquiring from several sensor elements at the same time allows for faster read out from the fingerprint sensor.

The second time-varying voltage is higher than first time-varying voltage, and the difference between the second time-varying voltage and the first time-varying voltage is the supply voltage. The supply voltage may, for example, be 3.3 V, 2.5 V or 1.8 V.

According to various embodiments, the step of acquiring may comprise the steps of controlling each sensor element in a first set of sensor elements in such a way that the variation of the low potential and the high potential results in a variation of a potential of the sensing structure of each sensor element in the first set, and each sensor element in the first set provides the signal indicative of the capacitive coupling between the sensing structure and the finger placed on the surface of the fingerprint sensor; and controlling each sensor element in a second set of sensor elements different from the first set of sensing structures in such a way that the variation of the low potential and the high potential results in a variation of a potential of the sensing structure of each sensor element in the second set. The sensor elements in the second set do not provide signals indicative of the capacitive coupling between those sensing structures and the finger.

Furthermore, the step of acquiring may additionally comprise the step of controlling each sensor element in a third set of sensing elements in such a way that a potential of the sensing structure of the sensor element is constant or varies over time with a peak-to-peak amplitude being lower than a peak-to-peak amplitude of a potential of the sensing structure of each sensor element in the first set of sensor elements.

Moreover, the method according to embodiments of the present invention may advantageously further comprise the step of providing, through a communication interface comprised in the fingerprint sensor, a signal indicative of a fingerprint pattern of the finger, the signal indicative of the fingerprint pattern of the finger further encoding error correction data for enabling error correction.

Further embodiments of, and effects obtained through this second aspect of the present invention are largely analogous to those described above for the first aspect of the invention.

According to a third aspect of the present invention, it is provided a method of operating a fingerprint sensor comprising a sensor array comprising a plurality of sensor elements each comprising a sensing structure facing a surface of the fingerprint sensor, wherein each of the sensor elements is configured to provide a signal indicative of a capacitive coupling between the sensing structure and a finger placed on the surface of the capacitive fingerprint sensor; a power supply interface having a low potential input receiving a low potential and a high potential input receiving a high potential, for providing power to the sensor array; excitation signal generating circuitry for generating a time-varying, in relation to the low potential, excitation signal for synchronizing operation of the fingerprint sensor; and an excitation signal output for output of the excitation signal from the fingerprint sensor, wherein the method comprises the steps of: conductively connecting the excitation signal output to a reference potential of a device comprising the fingerprint sensor resulting in a variation over time, in relation to the reference potential, of the low potential and the high potential; providing a substantially constant potential difference between the high potential and the low potential; and acquiring from each of the sensor elements, while providing the excitation signal, the signal indicative of the capacitive coupling between the sensing structure and the finger placed on the surface of the fingerprint sensor.

In summary, the present invention relates to a fingerprint sensing system comprising a sensor array with a plurality of sensing structures and read-out circuitry connectable to each of the sensing structures, and power supply circuitry arranged to provide to the read-out circuitry a substantially constant supply voltage being a difference between a high potential and a low potential. The fingerprint sensing system is configured in such a way that the low potential and the high potential are variable while substantially maintaining the supply voltage, and the read-out circuitry is connectable to each of the sensing structures in such a way that a variation in the low potential and the high potential while substantially maintaining the supply voltage results in a change of the charge carried by a sensing structure connected to the read-out circuitry. The change in charge is indicative of a capacitive coupling between the sensing structure and the finger.

BRIEF DESCRIPTION OF THE DRAWINGS

These and other aspects of the present invention will now be described in more detail, with reference to the appended drawings showing an example embodiment of the invention, wherein:

FIG. 1 schematically illustrates an application for a fingerprint sensing system according to an example embodiment of the present invention;

FIG. 2 schematically shows the sensor array comprised in the fingerprint sensing system in FIG. 1;

DETAILED DESCRIPTION OF EXAMPLE EMBODIMENTS

Figure 3:
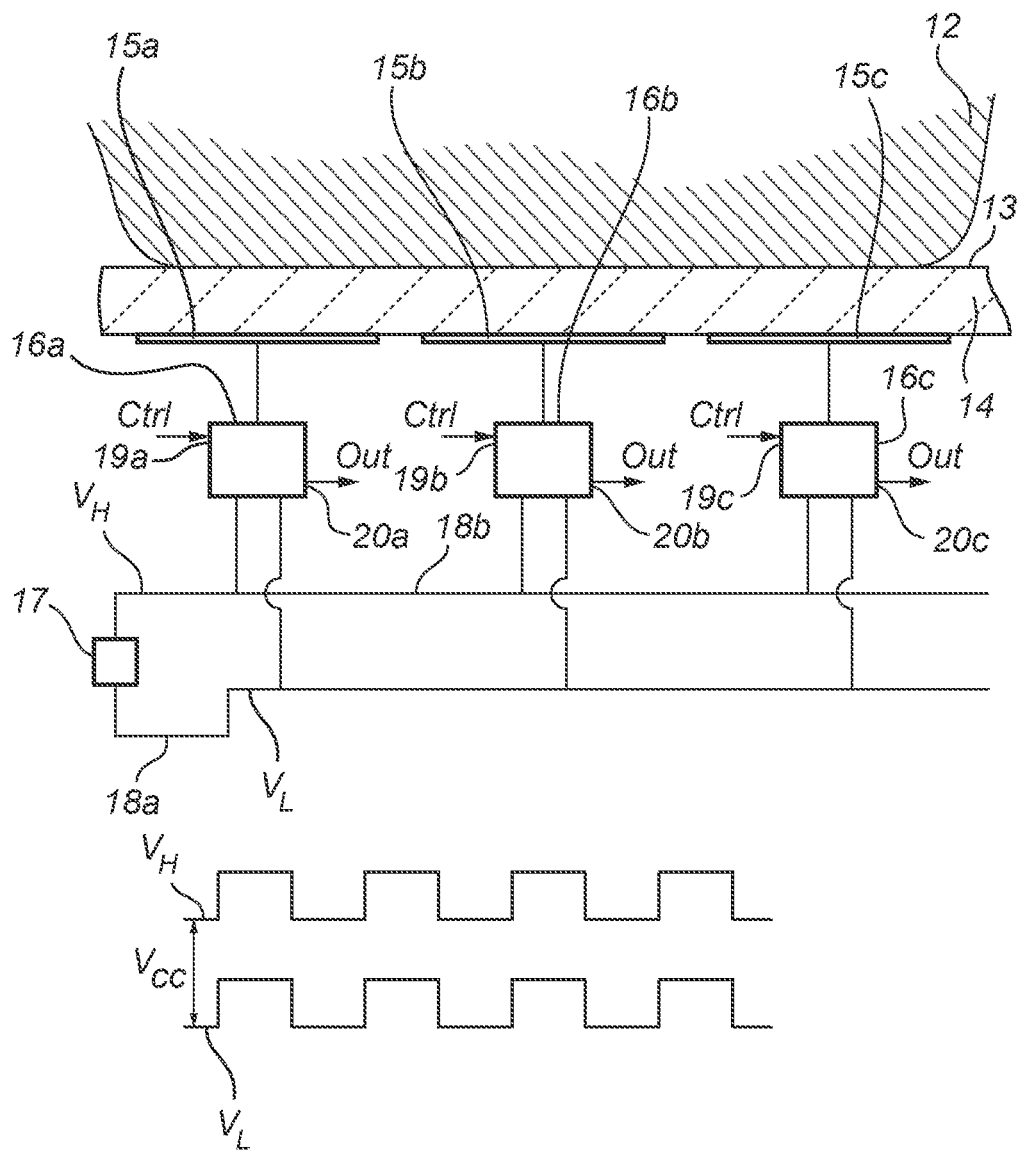
FIG. 3 is a schematic functional illustration of the fingerprint sensing system according to an example embodiment of the present invention where sensing structures and a fingerprint ridge are shown in cross-section.

In the present detailed description, various embodiments of the fingerprint sensing system and method according to the present invention are mainly described with reference to a fingerprint sensing system in which the low potential and the high potential of the supply voltage for powering the sensor array are actively controlled to vary in synchronization with the read-out from the individual sensing structures in the sensor array. Moreover, the sensor array is illustrated as a touch sensor dimensioned and configured to acquire a fingerprint representation from a stationary finger.

It should be noted that this by no means limits the scope of the present invention, which equally well includes, for example, a fingerprint sensing system in which the potential of the finger is actively varied and the low potential and the high potential of the supply voltage for powering the sensor array follow the variations of the finger potential. Other sensor array configurations, such as a so-called swipe sensor (or line sensor) for acquiring a fingerprint representation from a moving finger, are also within the scope of the present invention as defined by the appended claims.

FIG. 1 schematically illustrates an application for a fingerprint sensing system according to an example embodiment of the present invention, in the form of a mobile phone 1 with an integrated fingerprint sensing system 2. The fingerprint sensing system 2 may, for example, be used for unlocking the mobile phone 1 and/or for authorizing transactions carried out using the mobile phone, etc.

FIG. 2 schematically shows the capacitive fingerprint sensor 4 comprised in the fingerprint sensing system 2 in FIG. 1. As can be seen in FIG. 2, the fingerprint sensor 4 comprises a sensor array 5, a power supply interface 6 and a communication interface 7. The sensor array 5 comprises a large number of pixels 8 (only one of the pixels has been indicated with a reference numeral to avoid cluttering the drawing), each being controllable to sense a distance between a sensing structure (top plate) comprised in the pixel 8 and the surface of a finger contacting the top surface of the sensor array 5. In the enlarged portion of the sensor array 5 in FIG. 2, a first set of pixels are marked 'S' for sensing, a second group of pixels are marked 'N' for non-sensing, and a third group of pixels are marked 'D' for driving.

The power supply interface 6 comprises first 10*a* and second 10*b* contact pads, here shown as bond pads, for connection of a supply voltage $V_{supply}$ to the fingerprint sensor 4.

The communication interface 7 comprises a number of bond pads for allowing control of the fingerprint sensor 4 and for acquisition of fingerprint data from the fingerprint sensor 4.

The fingerprint sensor 4 in FIG. 2 may advantageously be manufactured using CMOS technology, but other techniques and processes may also be feasible. For instance, an insulating substrate may be used and/or thin-film technology may be utilized for some or all process steps needed to manufacture the fingerprint sensor 4.

The functional configuration of the fingerprint sensing system 2 in FIG. 1 will now be described in more detail with reference to FIG. 3.

To aid the understanding of the reader, FIG. 3 is a hybrid of a schematic cross-section view and a functional block diagram. Referring to FIG. 3, a fingerprint ridge 12 contacts the top surface 13 of a dielectric layer 14 protecting the sensing structures 15*a-c*. Although not explicitly shown in FIG. 3, the fingerprint ridge 12 is of course surrounded by fingerprint valleys where the finger surface is spaced apart from the top surface 13 of sensor array 5. Connected to each of the sensing structures 15*a-c* is a corresponding pixel circuit 16*a-c*. The pixel circuits 16*a-c* are powered by a power source 17 via first 18*a* and second 18*b* power lines. As is indicated in FIG. 3, each pixel circuit 16*a-c* has a control input 19*a-c* and an output 20*a-c* for providing a signal indicative of the capacitive coupling between the corresponding sensing structure 15*a-c* and the finger 12.

In the example embodiment of FIG. 3, each pixel circuit 16*a-c* is controllable between a sensing state, a non-sensing state, and a driving state by providing corresponding control signals to the respective control inputs 19*a-c*.

When a pixel circuit, say 16*b*, is in the sensing state, so that the pixel is a sensing pixel (denoted by 'S' in FIG. 2), it is configured to provide, at its output 20*b*, a sensing signal indicative of a change of a charge carried by the sensing structure 15*b* to which it is connected. The change of the charge is in turn indicative of the capacitive coupling between the sensing structure (plate) 15*b* and the finger 12. The capacitive coupling is an indication of the distance between the top surface 13 of the sensor 4 and the finger surface.

When a pixel circuit, say 16*a* and 16*c*, is in the non-sensing state, the pixel is a non-sensing pixel (denoted by 'N' in FIG. 2). The pixel circuit 16*a,c* is then in such a state that no sensing signal is output. Other pixel circuits (not shown in FIG. 3) may be in a driving state so that their pixels are driving pixels (denoted by 'D' in FIG. 2). A driving pixel circuit provides a signal to the sensing structure (plate) to which it is connected.

During a sensing operation, the low potential $V_L$ and the high potential $V_H$ defining the supply voltage $V_{supply}$ are allowed to vary as is schematically indicated in FIG. 3. Accordingly, each of the pixel circuits 16*a-c* will be powered using a substantially constant supply voltage $V_{supply}$, which moves up and down in potential as is schematically indicated in FIG. 3.

The pixel circuits 16*a-c* are connected to their respective sensing structures 15*a-c* in such a way that a variation, in relation to a reference potential of the electronic device 1 in which the fingerprint sensing system 2 is included, in the low potential $V_L$ and the high potential $V_H$ while substantially maintaining the supply voltage $V_{supply}$ results in a variation of the potential also on the respective sensing structures 15a-c connected to the pixel circuits 16a-c.

It should be noted that the description provided in connection with FIG. 3 focuses on the supply of power to the sensor array and that the exact circuit and/or physical layout of each sensor element/pixel is not described in detail.

As will be appreciated by the skilled person, many different circuit layouts and/or physical layouts will be within the scope of the present invention. One example of a suitable pixel layout is provided in U.S. Pat. No. 7,864,992, which is hereby incorporated by reference in its entirety. This exemplary pixel configuration will also be described further below with reference to FIGS. 10a-b.

In some embodiments, it may be desirable to reduce the number of pixels that exhibit a varying potential on its respective sensing structure to reduce capacitive drive of the finger. This may be achieved by allowing only a segment of the sensor array to vary in potential, or by using the driving capability that the pixel circuits may have.

In embodiments where all pixel circuits are connected to the same power supply lines 18a-b, the reference potential (local ground) for each pixel circuit will follow the potential variations, in relation to a reference potential of the electronic device 1 in which the fingerprint sensing system 2 is included, on the power supply lines 18a-b. If all sensing structures of the sensor array 5 are allowed to follow the potential variation of the power supply lines 18a-b, the sensing structures may collectively drive the finger 12 capacitively. This capacitive drive of the finger 12 may reduce the desired potential difference between the finger and the sensing structure(s) 15b of the currently sensing pixel(s) ('S').

An exemplary method of reducing the effect of this unwanted capacitive drive of the finger 12 is to control selected pixel circuits to their driving state and to provide a drive signal $V_{drive}$ to the sensing structures of the driving ('D') pixels, which drive signal $V_{drive}$ is substantially in anti-phase with the variation of the potential $V_S$ induced by the varying low $V_L$ and high $V_H$ potentials.

Figure 4:
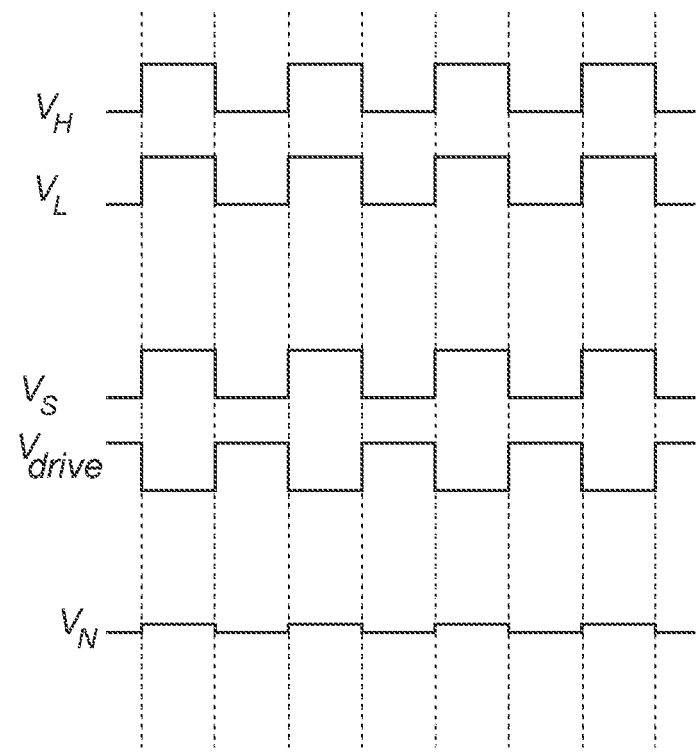
FIG. 4 schematically illustrates a method for reducing unwanted capacitive driving of the finger.

The resulting potential $V_N$ on the sensing structures of the driving ('D') pixels may, depending on the amplitude of the variations of the low $V_L$ and high $V_H$ potentials, be substantially constant or, as is schematically illustrated in FIG. 4, vary with a lower peak-to-peak amplitude than the potential $V_S$ on the sensing structure(s) 15b of the sensing ('S') pixel(s).

In the following, three example embodiments of the fingerprint sensing system according to the present invention will be described with reference to the schematic functional illustrations provided in FIGS. 5, 6, and 7a-c.

Figure 5:
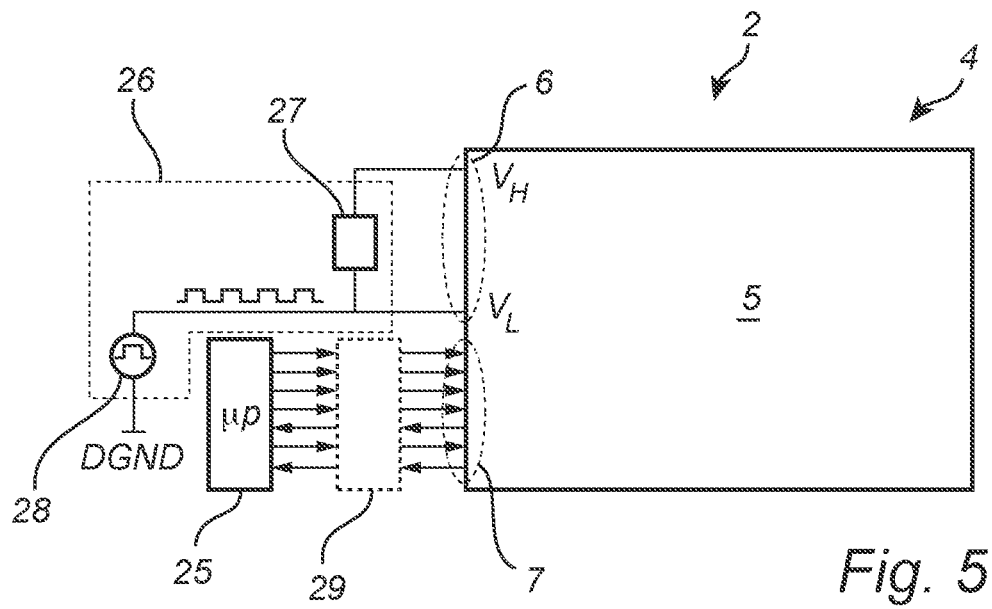
FIG. 5 is a schematic illustration of a first embodiment of the fingerprint sensing system according to the present invention.

Starting with the first example embodiment, FIG. 5 schematically shows a fingerprint sensing system 2 comprising a fingerprint sensor 4, processing circuitry 25, here in the form of a microprocessor, and power supply circuitry 26.

The fingerprint sensor 4 comprises, as was also described above with reference to FIG. 2, a sensor array 5, a power supply interface 6 and a communication interface 7. The communication interface 7 is, in the present example, provided in the form of an SPI-interface (Serial Peripheral Interface).

The microprocessor 25 acquires fingerprint data from the fingerprint sensor 4 and may process the fingerprint data as required by the application. For instance, the microprocessor 25 may run a fingerprint matching (verification and/or identification) algorithm.

The power supply circuitry 26 comprises a sensor voltage source 27 configured to output the supply voltage $V_{supply}$ and a pulse generator, here a square wave pulse generator 28, for modulating the low potential side of the sensor voltage source 27 in relation to a reference potential DGND of the electronic device 1 in which the fingerprint sensing system 2 is included.

As an alternative to a square wave signal, the pulse generator may generate any other suitable pulse shape, such as a sine wave or a saw tooth signal etc.

The sensor voltage source 27 may be provided in the form of a constant voltage source, such as a battery, dedicated to supplying power to the fingerprint sensor 4. Alternatively, the sensor voltage source 27 may comprise isolation circuitry for at least partly isolating a voltage source from the fingerprint sensor 4.

Example configurations of the sensor voltage source 27 in which it comprises isolation circuitry will be described further below with reference to FIGS. 8a-b.

In this first embodiment, the fingerprint sensing system 2 does not comprise any external structure for electrically contacting the finger 12. For the fingerprint sensing system 2 in FIG. 5, it may therefore be beneficial to reduce unwanted capacitive drive, for example as described above with reference to FIG. 4.

As is schematically indicated using a box with dashed line boundaries, the fingerprint sensing system 2 may optionally additionally include isolation circuitry 29 for providing galvanic isolation or level shifting between the sensor array 5 and the microprocessor 25. Through the use of isolation circuitry 29, the microprocessor 25 is allowed to work independently of the varying, in relation to DGND, reference potential $V_L$ of the sensor array 5.

As was mentioned in the Summary section, the isolation circuitry 29 can be implemented in many different ways known to the skilled person. For instance, the isolation circuitry 29 may be implemented using components such as opto-couplers, coils and/or capacitors. Although shown here as separate circuitry, it should be understood that the isolation circuitry 29 may be integrated with the fingerprint sensor 4 or the microprocessor 25.

Figure 6:
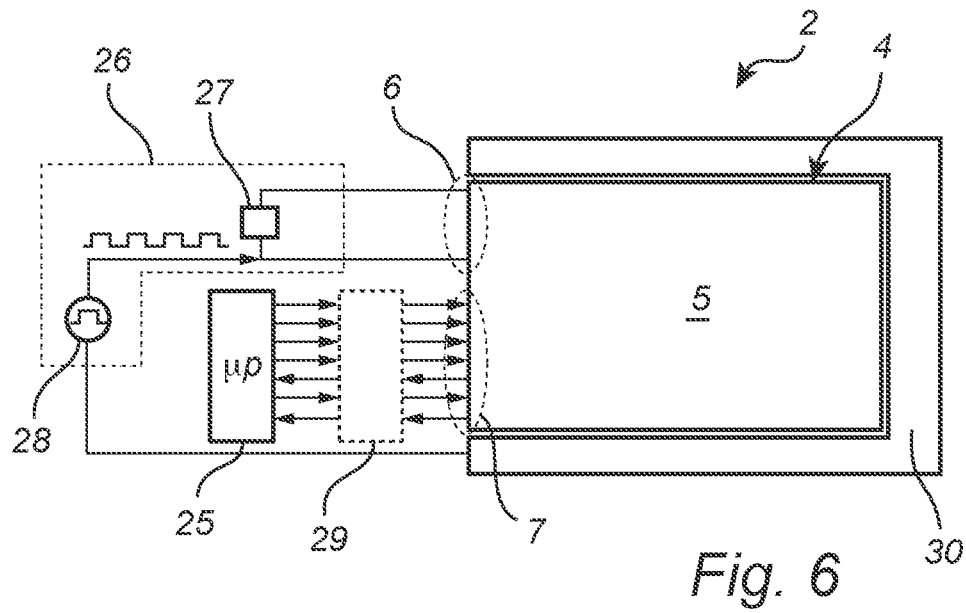
FIG. 6 is a schematic illustration of a second embodiment of the fingerprint sensing system according to the present invention.

FIG. 6 schematically shows a second embodiment of the fingerprint sensing system 2 in FIG. 1, that differs from the first embodiment described above with reference to FIG. 5 in that it additionally comprises a conductive bezel or frame 30 arranged adjacent to the fingerprint sensor 4 to allow the finger 12 to touch the bezel 30 when the finger 12 is placed on the fingerprint sensor 4.

Moreover, the pulse generator 28 is connected between the voltage source 27 and the bezel 30 instead of between the voltage source 27 and ground as in the first embodiment of FIG. 5.

Through the connection between the finger 12 and the conductive bezel 30, the effect of any unwanted capacitive drive can be mitigated.

Optionally, the conductive bezel 30 may be grounded which may be advantageous for handling ESD. When the fingerprint sensing system 2 is in use, the conductive bezel 30 will be in conductive contact with the user's finger. The finger (body) of the user is a much larger conductive body than the fingerprint sensor 4, which means that the finger potential will be largely unaffected by the pulse provided by the pulse generator 28, and the sensor ground potential $V_L$ will swing up and down as is schematically indicated in FIG. 6.

Figure 7A:
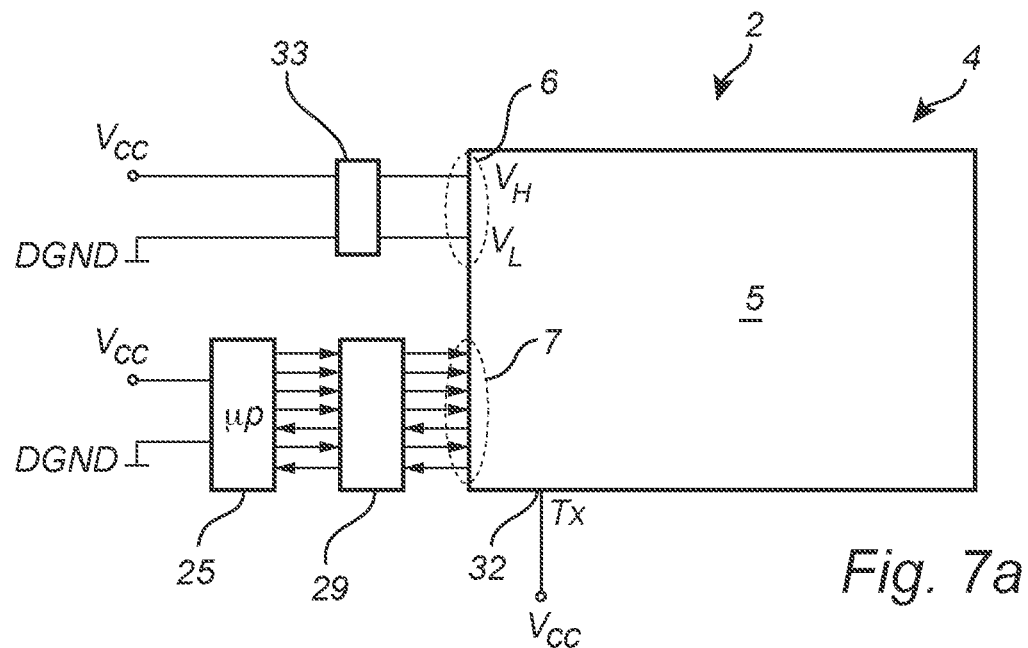
FIGS. 7*a-c* schematically illustrate a third embodiment of the fingerprint sensing system according to the present invention.
Figure 7B:
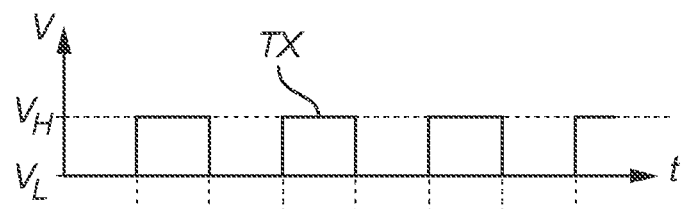
Figure 7C:
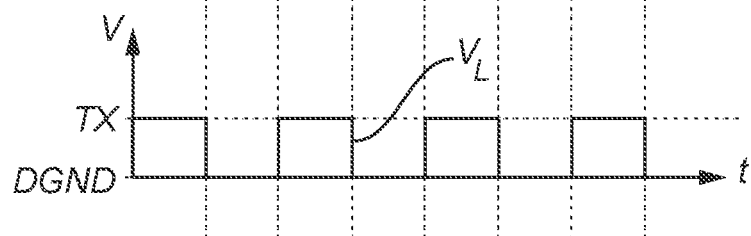

FIGS. 7a-c schematically illustrate a third embodiment of the fingerprint sensing system 2 in FIG. 1, that differs from the first embodiment described above with reference to FIG. 5 in that the power supply input to the fingerprint sensor 4 is not actively varied in relation to the device ground DGND, and in that the fingerprint sensor 4 additionally comprises excitation signal generating circuitry (not shown in FIG. 7*a*) for synchronizing the measurement and read-out (such as sampling and A/D-conversion) of signals indicative of the distance between sensing structures comprised in the sensor array 5 and the finger surface. The fingerprint sensor 4 in FIG. 7*a* further comprises an excitation signal output 32 for output of the excitation signal TX from the fingerprint sensor 5.

Between the voltage supply, providing a constant supply potential $V_{cc}$ related to device ground DGNC, and the voltage supply interface 6 of the fingerprint sensor 4, there is provided voltage isolation circuitry 33 making the potential levels on the fingerprint sensor side independent of the potential levels on the device side (left in FIG. 7*a*). The voltage isolation circuitry may be realized in many different ways known to one skilled in the relevant art. One example of suitable circuitry will be described below with reference to FIG. 8*b*. Other suitable circuitry include various transformer solutions or switched networks.

Operation of the fingerprint sensing system 2 in FIG. 7*a* will now be described with reference to the timing diagrams in FIGS. 7*b-c*.

The timing diagrams in FIGS. 7*b-c* both illustrate electric potential as a function of time, but in relation to different reference potentials.

In FIG. 7*b*, an exemplary excitation signal TX is shown in relation to the reference potential $V_L$ of the fingerprint sensor 4 (also referred to as sensor ground). As can be seen in FIG. 7*b*, the excitation signal TX is a square wave signal varying over time between a low level $V_L$ and a high level $V_H$.

FIG. 7*c* shows the same excitation signal TX as in FIG. 7*b*, but now in relation to device ground DGND. Since, as is schematically illustrated in FIG. 7*a*, the excitation signal output 32 is conductively connected to the supply potential $V_{cc}$ of the device 1, which is a constant potential in relation to the device ground DGND, and the fingerprint sensor system 2 is configured such that the potential levels of the fingerprint sensor 4 can swing up and down in potential, the excitation signal TX will exhibit a substantially constant potential in relation to device ground. Consequently, the sensor ground $V_L$ will vary over time in relation to device ground DGND as is schematically indicated in FIG. 7*c*.

Figure 8A:
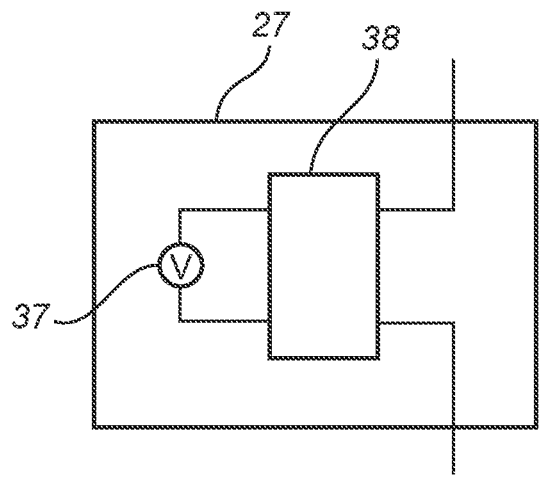
FIGS. 8*a-b* schematically show example embodiments of the power supply circuitry comprised in the fingerprint sensing system.

FIG. 8*a* schematically shows a first embodiment of the sensor voltage source 27 comprising a voltage source 37, such as a battery, and isolation circuitry 38. The isolation circuitry 38 is configured to provide galvanic isolation between its input side, to which the voltage source 37 is connected, and its output side, that is connected to the sensor 4 as shown in FIGS. 5 and 6. The isolation circuitry 38 in FIG. 8*a* may be implemented in many different ways known to the skilled person. For instance, the isolation circuitry 38 may be implemented using components such as opto-couplers, coils and/or capacitors. Although shown here as separate circuitry, it should be understood that the isolation circuitry 38 may be integrated in the fingerprint sensor 4.

Figure 8B:
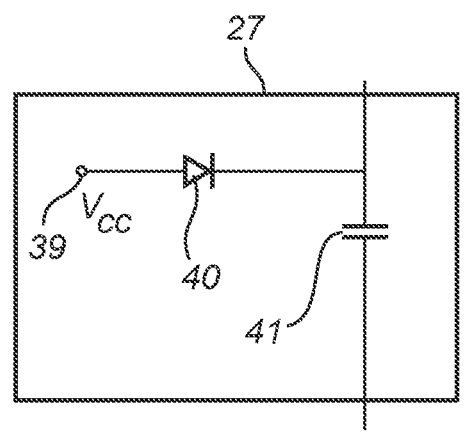

FIG. 8*b* schematically shows a second embodiment of the sensor voltage source 27 comprising an input 39, a diode 40 and a capacitor 41. The diode 40 is connected between the input 39 of the sensor voltage source 27 and the high potential input of the fingerprint sensor 4, and the capacitor 41 is connected between the low potential $V_L$ and the high potential $V_H$ of the supply voltage for the fingerprint sensor 4. The input 39 is for connection of the supply voltage $V_{cc}$ of the device comprising the fingerprint sensing system 2 as was described above with reference to FIGS. 7*a-c*.

The isolation circuit in FIG. 8*b* does not provide full galvanic isolation between the supply voltage $V_{cc}$ and the fingerprint sensor 4, but enables the provision of time-varying low potential $V_L$ and high potential $V_H$ to the fingerprint sensor 4 even though the supply voltage (or rather supply potential) $V_{cc}$ remains constant.

It should be noted that the voltage source 37 in FIG. 8*a* as well as the supply voltage $V_{cc}$ provided on the input 39 in FIG. 8*b* may typically be used for providing power to additional devices, such as the microprocessor 25 and/or other components of the device comprising the fingerprint sensing system 2.

Above, the use of isolation circuitry 29 was discussed as a means for enabling acquisition of fingerprint data from a sensor array with a varying (swinging) reference potential. Alternatively, the fingerprint data from the sensor array 5 may be acquired by the microprocessor 25 without the use of isolation circuitry 29 by scheduling read-out from the pixels 8 and acquisition of the fingerprint data from the sensor array 5 in different time slots.

Figure 9:
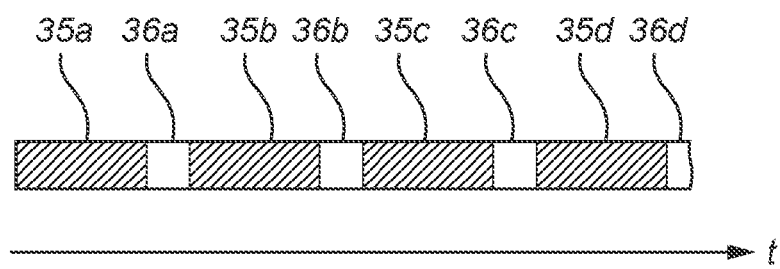
FIG. 9 schematically illustrates an advantageous timing of read-out and communication with the sensor array in the fingerprint sensing system according to embodiments of the present invention.

This will now be described with reference to the timing diagram in FIG. 9, where each time slot 35*a-d* for sensor read-out is followed by a time slot 36*a-d* for acquisition of fingerprint data from the sensor array. Signals from all pixels may be sampled and processed (for example converted to digital) during each time slot 35*a-d* for sensor read-out, or a segment of the sensor may be sampled and processed during each time slot 35*a-d* for sensor read-out. In the latter case, fingerprint data corresponding to the segment that is sampled and processed during a particular time slot 35*a-d* for read-out is acquired during the subsequent time slot 36*a-d* for acquisition of fingerprint data.

During the time slots 35*a-d* for sensor read-out, the power supply circuitry 26 is controlled to allow the low $V_L$ and high $V_H$ potentials defining the supply voltage $V_{supply}$ to vary, and during the time slots 36*a-d* for fingerprint data acquisition, the power supply circuitry 26 is controlled to keep the low $V_L$ and high $V_H$ potentials constant. In particular, the power supply circuitry 26 may be controlled to set the low potential $V_L$ to the same potential as the ground potential of the microprocessor 25 (device ground DGND).

An example configuration of the sensing elements 8 comprised in above-described embodiments of the fingerprint sensor 4 will now be described with reference to FIGS. 10*a-b*.

Figure 10A:
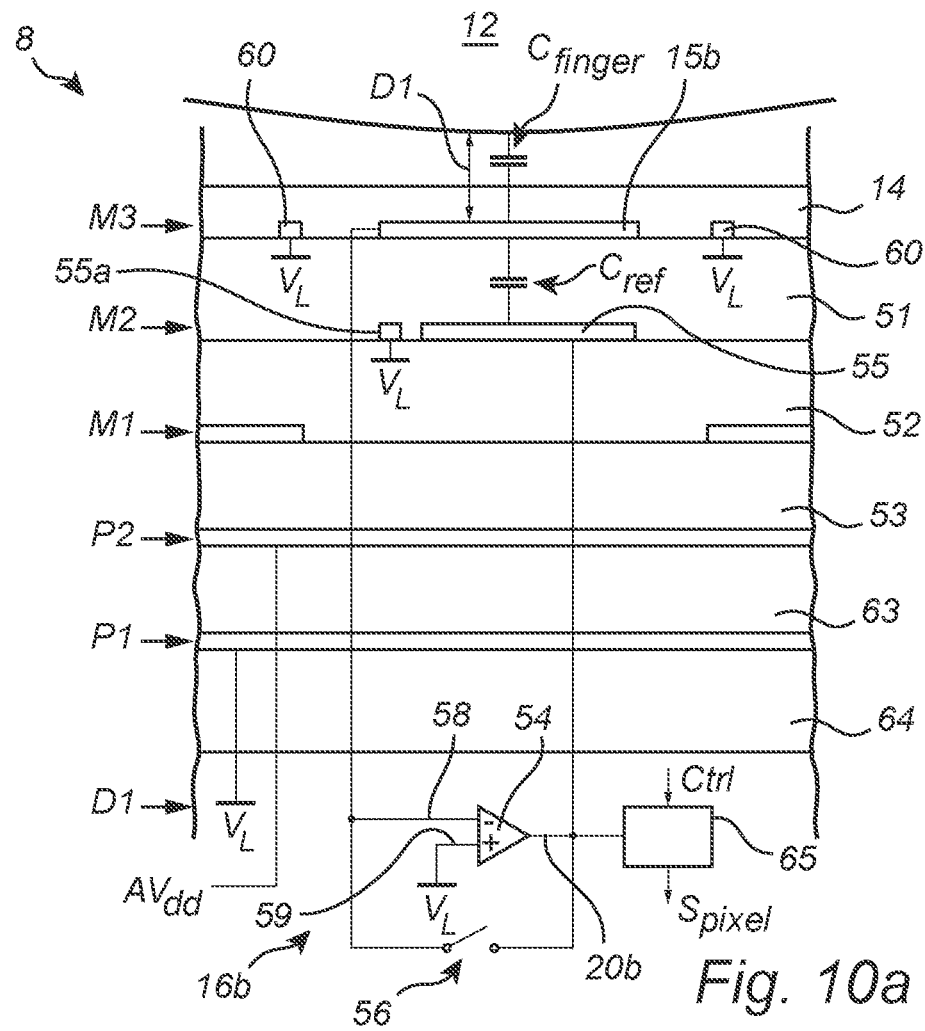
FIGS. 10*a-b* schematically illustrate example configurations of sensing elements comprised in embodiments of the fingerprint sensing system according to the present invention.

As can be seen in FIG. 10*a*, the sensing elements are formed in a layer structure comprising three conductive layers; a conductive layer M3 at the top, a conductive layer M2 in the middle and a lower conductive layer M1, with first 51, second 52, and third 53 layers of an insulating dielectric material under the respective conductive layers M3, M2, M1. Examples of materials for the conductive layers are typically copper, aluminum and doped polycrystalline silicone. Examples of materials for the insulating layers are typically SiO2, SiN, SiNOx and spin-on glass.

In addition, the layered structure used to form the sensing elements 3 may comprise a fourth layer P2 (second polysilicon) constituted by an electrically conducting layer which is kept at a certain analog voltage potential $AV_{dd}$ in relation to sensor ground $V_L$. Further, there is a fifth layer P1 (first polysilicon) that is also constituted by an electrically conducting layer which is kept at sensor ground potential $V_L$, working as an electric shielding. Under each one of these layers P2, P1 there are fourth 63 and fifth 64 layers of an insulating dielectric material. At the bottom, there is a semi conductive substrate layer D1 comprising active components such as the charge amplifiers 54. The conductive layers P2, P1 as well as the lower conductive layer M1 described above, may for example be used for routing of electrical connections, resistors and electrical shielding. One of the conductive layers P2, P1 may also be used to form the lower electrode 55 of each sensing element 8 instead of the second metal layer M2.

The sensing element 8 shown in FIG. 10a comprises a sensing structure 15b formed in the top conductive layer M3. The sensing structure 15b is connected to a sensing element circuit 16b comprising a charge amplifier 54, a lower electrode 55, a reset switch 56, and sample-and-hold circuitry 65.

As can be seen in FIG. 10a, the sensing structure 15b is connected to the negative input terminal 58 of the charge amplifier 54. The positive input terminal 59 of the charge amplifier 54 is connected to the sensor ground potential $V_L$. Hence, by means of the charge amplifier 54, the corresponding sensing structure 15b is virtually grounded (sensor ground), since the voltage over the input terminals 58, 59 of the charge amplifier 54 is almost zero. Depending on the circuit implementation of the charge amplifier there may be a small substantially constant voltage, such as the gate voltage of a CMOS transistor, between the negative 58 and positive 59 input terminals of the operational amplifier.

Figure 10B:
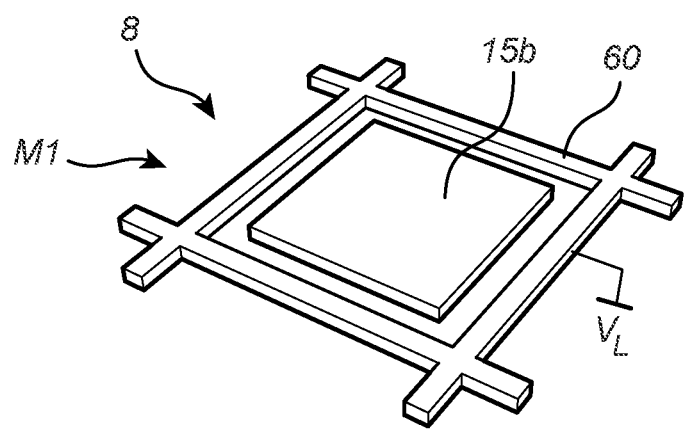

As can also be seen in FIG. 10b, each sensing structure 15b may be surrounded by a shield frame 60 formed in the top conductive layer M3, where the shield frame 60 is connected to the sensor ground potential $V_L$ as a conductive shielding to prevent lateral parasitic capacitances between adjacent sensing structures 15b, thus preventing or at least reducing so-called crosstalk between the sensing elements 8. The shield frame 60 may also be connected to another suitable potential.

Further, referring again to FIG. 10a, there is a protective dielectric layer 14 covering each of the sensing structures 15b, to protect the sensing elements 8 from ESD (Electrostatic Discharge) and external wear. A finger 12 that comes into the vicinity of the upper surface of the protective layer 14 gives rise to a capacitance $C_{finger}$ between the finger 12 and the sensing structure 15b.

As can be seen in FIG. 10a, the lower electrode 55 comprised in the sensing element circuit 16b is formed in the middle conductive layer M2. The lower electrode 55 is connected to an output terminal 20b of the charge amplifier 54. There is a feedback capacitance $C_{ref}$ formed between the sensing structure 15b and each lower electrode 55, which feedback capacitance $C_{ref}$ is connected between the negative input terminal 58 of the charge amplifier 54 and the output terminal 20b.

An auxiliary lower electrode 55a is also formed in the middle conductive layer M2, adjacent to the lower electrode 55. The auxiliary lower electrode 55a is connected to the sensor ground potential $V_L$ and used as an extra shielding, since the lower electrode 55 may typically have a smaller area than the sensing structure 15b.

The lower electrode 55 may be configured to achieve the desired gain for the sensor element circuit 16b. In particular, the size of the lower electrode 55 may be suitably selected, since the gain depends on the feedback capacitance $C_{ref}$, which in turn is dependent on the physical dimensions of the sensing structure 15b, the lower electrode 55, and the first insulating layer 51. The size of the auxiliary lower electrode 55a may be adjusted so as to fit beside the lower electrode 55.

As described above, swinging the sensor ground potential $V_L$ in relation to the potential of the finger 12 will result in a change in the voltage between each sensing structure 15b and the finger 12, which will in turn result in a change of the charge carried by the sensing structures 15b.

The change of charge that is carried by the sensing structure 15b is proportional to the capacitance $C_{finger}$ between the skin and the sensing structure 15b. As the sensing structure 15b is virtually grounded in relation to sensor ground $V_L$, its charge is transferred by the charge amplifier 54 to the lower electrode 55. We may then calculate the voltage output from the charge amplifier 54 as:

$$U_{out}=(C_{finger}/C_{ref})U_{in}$$

The output voltage $U_{out}$ is sampled by the sample-and-hold circuitry 65, preferably using correlated double-sampling to remove the low frequency component of the common mode noise.

The sample-and-hold circuitry 65 is controlled by a control signal and outputs the pixel signal $S_{pixel}$ indicative of the capacitive coupling between sensing structure 15b and finger 12 to an analog-to-digital converter (not shown).

The person skilled in the art realizes that the present invention by no means is limited to the example embodiments described above. For example, the read-out circuitry and the driving circuitry may be provided as separate circuits.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A fingerprint sensing system comprising:
   a sensor array having:
      a plurality of sensing structures; and
      read-out circuitry connected to each of said sensing structures for providing sensing signals; and
   power supply circuitry arranged to provide to said read-out circuitry a substantially constant supply voltage being a difference between a high driving voltage potential and a low driving voltage potential, wherein:
   the fingerprint sensing system is configured in such a way that, during operation of said fingerprint sensing system, said low driving voltage potential and said high driving voltage potential oscillate in phase in relation to a reference potential of a device comprising said fingerprint sensing system, while substantially maintaining said supply voltage.

2. The fingerprint sensing system according to claim 1, wherein said power supply circuitry is configured to provide a first time-varying potential, varying in relation to said reference potential, as said low driving voltage potential and a second time-varying potential as said high driving voltage potential.

3. The fingerprint sensing system according to claim 1, wherein said power supply circuitry comprises isolation circuitry having an input side for connection to a voltage source and an output side connected to said sensor array, said isolation circuitry being configured to prevent current to flow from said output side to said input side, to allow for an output potential on said output side being different from an input potential on said input side.

4. The fingerprint sensing system according to claim 3, wherein said isolation circuitry is configured to provide galvanic isolation between said input side and said output side.

5. The fingerprint sensing system according to claim 1, wherein said sensor array further comprises driving circuitry connectable to each of said sensing structures and controllable to change a potential, in relation to said low driving voltage potential, of a sensing structure connected to said driving circuitry.

6. The fingerprint sensing system according to claim 1, further comprising processing circuitry connected to said sensor array via a communication interface for acquiring fingerprint data from said sensor array.

7. The fingerprint sensing system according to claim 6, further comprising isolation circuitry for providing galvanic isolation between said sensor array and said processing circuitry.

8. The fingerprint sensing system according to claim 6, wherein said low driving voltage potential and said high driving voltage potential are variable in relation to a reference potential of said processing circuitry.

9. The fingerprint sensing system according to claim 6, wherein said power supply circuitry is configured to keep each of said low driving voltage potential and said high driving voltage potential substantially constant, in relation to said reference potential of the processing circuitry, during time periods when said processing circuitry acquires fingerprint data from said sensor array.

10. The fingerprint sensing system according to claim 1, wherein said fingerprint sensing system further comprises an electrically conductive structure being arranged to be in electrical contact with said finger when said finger is placed on said surface of said sensor array.

11. The fingerprint sensing system according to claim 1, wherein said sensor array comprises:
   excitation signal generating circuitry for generating a time-varying, in relation to said low driving voltage potential, excitation signal for synchronizing operation of said read-out circuitry; and
   an excitation signal output for output of said excitation signal from said sensor array,
   wherein said excitation signal output is conductively connected to said reference potential, thereby forcing said low driving voltage potential and said high driving voltage potential to vary over time in relation to said reference potential.

12. The fingerprint sensing system according to claim 1, wherein:
   said fingerprint sensing system further comprises a conductive finger contacting structure arranged adjacent to said sensor array for electrically contacting said finger; and
   said sensor array comprises:
     excitation signal generating circuitry for generating a time-varying, in relation to said low driving voltage potential, excitation signal for synchronizing operation of said read-out circuitry; and
     an excitation signal output for output of said excitation signal from said sensor array,
   wherein said excitation signal output is conductively connected to said finger contacting structure, thereby forcing said low driving voltage potential and said high driving voltage potential to vary over time in relation to a potential of said finger.

13. An electronic device comprising:
   the fingerprint sensing system according to claim 11, and processing circuitry configured to:
     acquire a representation of said fingerprint pattern from the fingerprint sensing system;
     authenticate a user based on said representation; and
     perform at least one user-requested process only if said user is authenticated based on said representation,
   wherein the excitation signal output of the sensor array comprised in said fingerprint sensing system is conductively connected to the reference potential of the electronic device.

14. A method of operating a fingerprint sensor comprising:
   a sensor array comprising a plurality of sensor elements; and
   a power supply interface having a low driving voltage potential input and a high driving voltage potential input for providing power to said sensor array,
   wherein said method comprises the steps of:
     providing a first time-varying driving voltage potential, in relation to a reference potential of a device comprising said fingerprint sensor, to said low driving voltage potential input of the power supply interface and a second time-varying driving voltage potential, in relation to a reference potential of a device comprising said fingerprint sensor, to said high driving voltage potential input of the power supply interface, said first time-varying driving voltage potential and said second time-varying driving voltage potential oscillating in phase in such a way that a difference between said second time-varying driving voltage potential and said first time-varying driving voltage potential is a substantially constant voltage; and
     acquiring a sensing signal from each of said sensor elements, while providing said first time-varying driving voltage potential and said second time-varying driving voltage potential.

15. The method according to claim 14, further comprising the step of:
   providing, through a communication interface comprised in said fingerprint sensor, a signal indicative of a fingerprint pattern of said finger,
   said signal indicative of the fingerprint pattern of said finger further encoding error correction data for enabling error correction.

* * * * *